United States Patent
Volpe et al.

(10) Patent No.: US 6,981,122 B2
(45) Date of Patent: Dec. 27, 2005

(54) METHOD AND SYSTEM FOR PROVIDING A CONTIGUOUS MEMORY ADDRESS SPACE

(75) Inventors: Thomas A. Volpe, Austin, TX (US); Michael S. Allen, Austin, TX (US); Aaron Bauch, Boxborough, MA (US)

(73) Assignee: Analog Devices, Inc., Norwood, MA (US)

( * ) Notice: Subject to any disclaimer, the term of this patent is extended or adjusted under 35 U.S.C. 154(b) by 201 days.

(21) Appl. No.: 10/255,399

(22) Filed: Sep. 26, 2002

(65) Prior Publication Data

US 2004/0064667 A1 Apr. 1, 2004

(51) Int. Cl.$^7$ .............................................. G06F 12/00
(52) U.S. Cl. ........................ 711/202; 711/5; 365/230.03
(58) Field of Search ............................ 711/202, 5, 117, 711/170–173; 365/230.02–230.03

(56) References Cited

U.S. PATENT DOCUMENTS

| | | | |
|---|---|---|---|
| 3,813,652 A * | 5/1974 | Elmer et al. ................. 711/209 |
| 4,908,789 A * | 3/1990 | Blokkum et al. ............ 711/172 |
| 5,175,836 A * | 12/1992 | Morgan ....................... 711/172 |
| 5,392,252 A * | 2/1995 | Rimpo et al. ............. 365/230.02 |
| 5,737,563 A * | 4/1998 | Shigeeda ........................ 711/5 |
| 6,070,227 A * | 5/2000 | Rokicki ....................... 711/117 |
| 6,205,511 B1 | 3/2001 | Wen | |
| 6,226,724 B1 | 5/2001 | Biggs | |
| 6,356,991 B1 | 3/2002 | Bauman et al. | |
| 6,430,648 B1 * | 8/2002 | Carnevale ....................... 711/5 |
| 6,601,130 B1 * | 7/2003 | Silvkoff et al. ................. 711/5 |
| 6,606,684 B1 * | 8/2003 | Ramagopal et al. .......... 711/118 |
| 2002/0097629 A1 * | 7/2002 | Lee ........................ 365/230.03 |

OTHER PUBLICATIONS

Texas Instruments, TMS320C6211, TMS320C6211B, Fixed-Point Digital Signal Processors, Aug. 1998, revised Sep. 2001, pp. 1-76.
Motorola, MCF5407 ColdFire® Integrated Microprocessor User's Manual, Rev. 0.1, Nov. 2001, pp. i-xliv, 1-1 to 1-17, 4-1 to 4-32 and 11-1 to 11-39.
Intel® StrongARM* SA-1110 Microprocessor, Developer's Manual, Oct. 2001, pp. 1-38, 65-67 and 119-203.
Hitachi SuperH™ RISC engine, SH7751 Series, SH7751, SH7751R, Hardware Manual, ADE-602-201B, Rev. 3.0, Apr. 11, 2002, pp. i-xxiv and 13-48.

* cited by examiner

*Primary Examiner*—Nasser Moazzami
(74) *Attorney, Agent, or Firm*—Wolf, Greenfield & Sacks, P.C.

(57) ABSTRACT

A memory system and a method for operating a memory system are provided. The memory system includes a set of memory banks, logic for calculating a first address in each memory bank from the set of memory banks and a controller receiving a transfer address from a computing device. The controller includes logic for selecting a memory bank from the set of memory banks based on the transfer address and the first addresses of the memory banks, and for mapping the transfer address to a target address in the selected memory bank based on a first address in the selected memory bank. As a result, the set of memory banks has a contiguous memory space.

27 Claims, 7 Drawing Sheets

Bank Size Encodings

| EBxSZ | Bank Size (Mbyte) | bank_x_size[4:0] |
|---|---|---|
| 00 | 16 | 00001 |
| 01 | 32 | 00010 |
| 10 | 64 | 00100 |
| 11 | 128 | 01000 |

FIG. 5

Bank Size Encodings

| SDRAM Bank | Bank Size (MB) | Start Address (hex) |
|---|---|---|
| 0 | 32 | 0x00000000 |
| 1 | 32 | 0x02000000 |
| 2 | 16 | 0x04000000 |
| 3 | 64 | 0x05000000 |
| Reserved | 368 | 0x09000000 |

FIG. 7

Start Address Calculation

| SDRAM Bank | bank_x_start_addr[28:24] |
|---|---|
| 0 | 00000 |
| 1 | 00000 + bank_0_size[4:0] |
| 2 | 00000 + bank_0_size[4:0] + bank_1_size[4:0] |
| 3 | 00000 + bank_0_size[4:0] + bank_1_size[4:0] + bank_2_size[4:0] |
| Unpopulated/ Reserved | 00000 + bank_0_size[4:0] + bank_1_size[4:0] + bank_2_size[4:0] + bank_3_size[4:0] |

FIG. 6

METHOD AND SYSTEM FOR PROVIDING A CONTIGUOUS MEMORY ADDRESS SPACE

FIELD OF THE INVENTION

This invention relates generally to a memory controller for a memory system and, more specifically, to a hardware memory controller providing a contiguous address space in a memory system with multiple memory banks.

BACKGROUND OF THE INVENTION

In computer processing systems, processing devices generally provide address signals to obtain access to other devices, such as memories. A memory device may be a memory system including multiple memory banks providing volatile data storage. There are numerous known memory types that can be used in processing systems. Synchronous Dynamic Random Access Memory (SDRAM) is a type of memory that is used in a wide variety of computer systems such as, for example, microprocessor and digital signal processor systems.

An SDRAM memory system may include a plurality of memory banks. Some memory systems permit banks of only one particular size, while others may permit banks of different sizes. Each memory bank may be divided into a plurality of pages. Pages are further logically divided into words. Words have a fixed number of bytes such as, for example, 16 bytes. Typically, an address sent from a processing device to the memory system indicates a particular word that is being accessed.

A number of address bits necessary to represent a location in a memory bank generally depends on the size of the memory bank, because the number of bits in the address must be sufficient to enumerate all possible addresses in the memory bank. For example, in systems where each byte can be addressed, at least 24 bits are needed to address each byte in a 16-megabyte memory bank (16 megabytes contain $2^{24}$ bytes), and therefore a minimum address size for such a bank is 24 bits.

Although minimum address sizes vary for memory banks of different sizes, a memory system typically has one standard address size that is used by the processing device to indicate a word that is being accessed. The standard address size is typically at least the minimum size for the largest allowed memory bank. For example, in a byte-addressed system allowing for memory banks ranging in size from 2 megabytes to 128 megabytes, an address for a particular byte is at least 27 bits wide (128 megabytes contain $2^{27}$ bytes). Additional address bits may be needed to indicate which of the memory banks is being addressed. For example, in a system having a maximum of 8 memory banks, at least 3 additional bits are needed to indicate location of the accessed word in one of the eight memory banks.

In a system that permits memory banks of different sizes, where all addresses are passed directly to the memory banks, there may be gaps in the address space—that is, there may not be any physical memory space corresponding to a particular set of addresses. Such gaps can occur when an address space is logically divided between available memory banks into equal subspaces. Some address subspaces may not be fully populated because they are larger than the actual memory bank to which they are assigned. For example, in a memory system allowing memory banks ranging from 2 to 128 megabytes, each memory bank may be allocated $2^{27}$ addresses, which is appropriate for a 128 megabyte memory bank. However, when a memory bank smaller than the maximum size of 128 megabytes is used, some addresses have no corresponding physical memory space, thereby producing a gap in the address space between the end of the smaller memory bank and the beginning of the following memory bank. As a result of the gap, the address space for the system is not contiguous.

In a system that does not provide a contiguous memory space for software applications, each software program (and, correspondingly, each programmer writing programs for that system) needs to know which addresses are available and to request access to only those addresses. Knowing which addresses are available requires additional consideration and effort from the programmers and compilers, and makes programs more complex and less efficient.

Some memory systems incorporate memory management controllers that provide a contiguous address space. Those controllers, however, are typically highly complex and require complex interaction with an operating system, which is undesired in embedded processors, real time processors, microprocessors and digital signal processors. Therefore, a system is needed in which a contiguous memory address is provided without a significant computational overhead.

SUMMARY OF THE INVENTION

According to a first aspect of the invention, a method is provided for operating a memory system comprising a set of memory banks and a memory controller. The method comprises selecting a memory bank from the set of memory banks based on a transfer address and indicators of sizes of the memory banks, and mapping the transfer address to a target address in the selected memory bank based on a first address in the selected memory bank, wherein the set of the memory banks has a contiguous memory space.

According to another aspect of the invention, a memory system is provided. The memory system comprises a set of memory banks, logic for calculating a first address in each memory bank from the set of memory banks, and a controller receiving a transfer address from a computing device. The controller comprises logic for selecting a memory bank from the set of memory banks based on the transfer address and the first addresses of the memory banks and for mapping the transfer address to a target address in the selected memory bank based on a first address in the selected memory bank, wherein the set of memory banks has a contiguous memory space.

According to a further aspect of the invention, a memory system is provided. The memory system comprises a set of memory banks and a memory controller. The memory controller includes means for selecting a memory bank from the set of memory banks based on a transfer address and indicators of sizes of the memory banks, and means for determining a target address based on the transfer address and a first address in the selected memory bank, wherein the set of memory banks has a contiguous memory space.

BRIEF DESCRIPTION OF THE DRAWINGS

FIG. 5 is a table illustrating possible encodings for bank memory sizes;

FIG. 6 is a table illustrating start address calculation;

FIG. 7 is a table illustrating an example of an implementation with start addresses corresponding to different memory banks.

DETAILED DESCRIPTION

The following detailed description should be read in conjunction with the attached drawings, in which similar reference numbers indicate similar structures. One embodiment is illustrated as a memory system with a hardware memory controller providing contiguous address memory space.

A processing device may include one or multiple processors for executing instructions. Such instructions may include memory access instructions which generate transfer requests. A processing system may have several memory levels, such as, for example, cache and memory. The processing device and associated cache located on the same chip may typically be referred to as "the core" or "the core processor" in a digital signal processor. The core may issue transfer requests to the memory system. The core and the memory system may be connected by one or multiple buses carrying addresses and data.

A memory system typically includes a memory controller and one or more memory banks. An illustrative embodiment of the invention includes a memory system with SDRAM memory banks. The invention, however, is not limited to a particular kind of memory and may be used in conjunction with any number of memory types and memory systems.

The processing device may access memory in any of the available SDRAM memory banks by sending a command and an address signal. The address signal indicates the memory location that is being accessed by the processing device. The memory controller typically receives the address signal from the processing device and determines a target memory bank and the address of the accessed location in the target memory bank. The target memory bank address may also be referred to as the SD (SDRAM) address. Data may be read from or written to the accessed location in the target memory bank.

The memory controller may be implemented in software or hardware, although, practically, a hardware implementation often provides faster operation and less overhead. Discussed in connection with FIGS. 3–7 is a hardware memory system of an illustrative embodiment.

Figure 1:
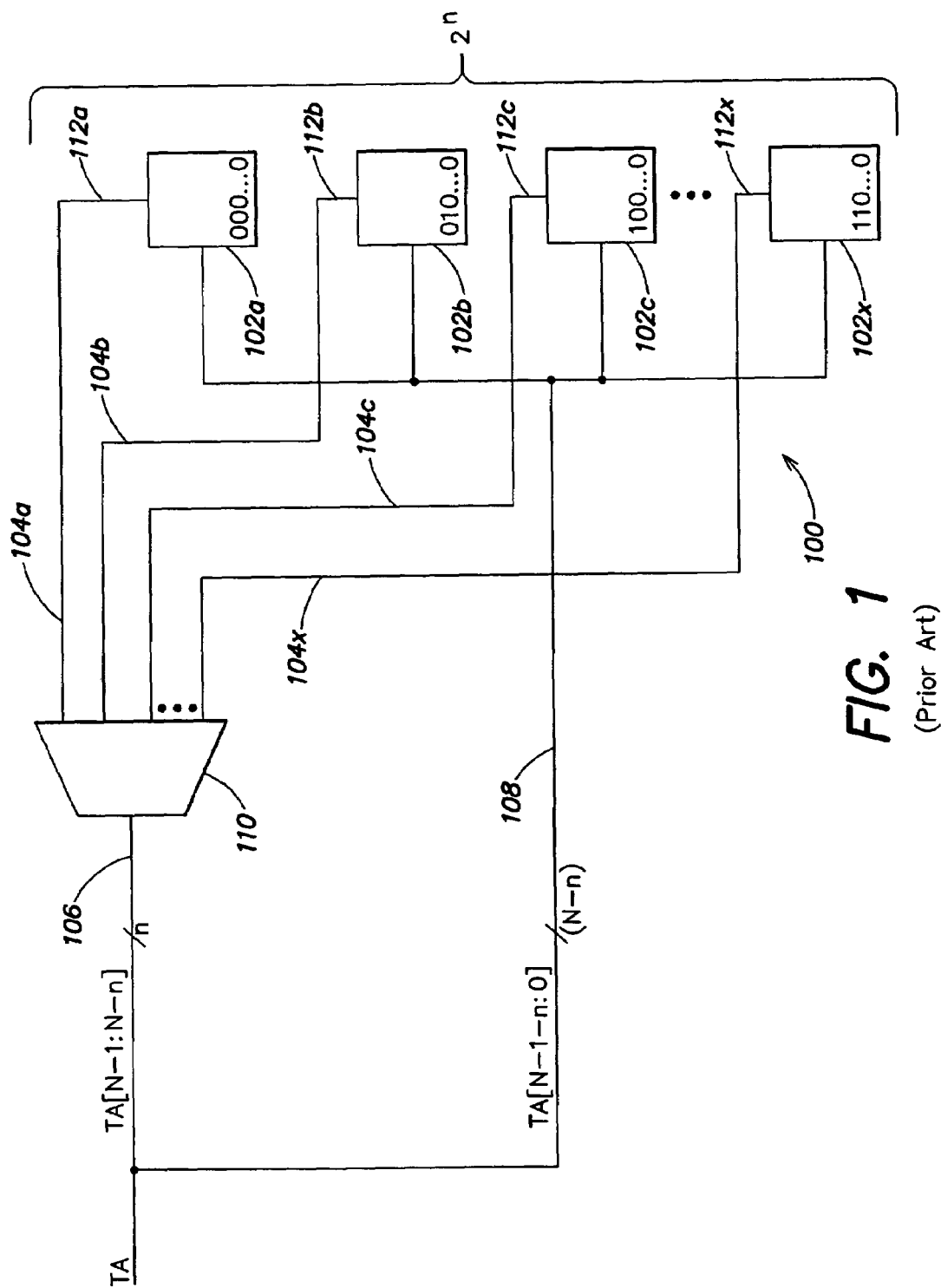
FIG. 1 is a schematic representation of a first prior art memory system with a memory controller determining target memory banks.

FIG. 1 is a schematic representation of a prior art memory system. Memory banks 102a–102x are connected to a memory controller 110 through enable lines 104a–104x and to a processing device through address lines 108. Encoded on lines 108 is a part of a transfer address. A transfer address is an address received from a processing device. The transfer address is N bits wide. Some bits of the transfer address may be passed directly to the memory banks on lines 108, and some may be connected to the memory controller that determines the target memory bank on lines 106.

Typically, address lines 106 carry the bits necessary to determine the target memory bank for the address. A notation TA[a:b] is used to indicate that bits a through b of the transfer address are carried on those lines. If there are $2^n$ memory banks, then a minimum of n bits are required to encode the target memory bank; these are bits TA[N−1:N−n].

The memory controller may be a simple decoder, which selects one of the $2^n$ outputs based on n inputs. Enable lines 104a–104x carry results of the decoding to the memory banks 102a–102x, respectively. Each memory bank 102 has a corresponding enable input 112. Enable lines 104a–104x are connected to enable inputs 112a–112x, respectively. When an enable input for a particular memory bank is asserted, that memory bank is said to be enabled, and it responds to the command from the processing device. Only the enable input of the target memory bank is asserted, and all other enable inputs are deasserted.

Address lines 108 carry the address of the accessed location in a memory bank, encoded in the first (N−n) bits of the transfer address. Typically, lines 108 are arranged such that all memory banks receive identical inputs. However, only the target memory bank responds to the command from the processing device because only the target memory bank is enabled.

With such an arrangement, the address memory space is logically divided into $2^n$ equal subsets of addresses, each corresponding to one of $2^n$ memory banks. Each subset has $2^{(N-n)}$ addresses, where $2^{(N-n)}$ is the size of the largest allowed memory bank. If a particular system has memory banks that are not of the maximum allowed size, then in such a system the available physical address space is not contiguous because subsets of the addresses belonging to smaller-than-largest-allowed memory banks are not fully populated. For example, in a system that supports memory banks up to 128 megabytes, subsets of addresses are $2^{27}$ bytes. If the first installed memory bank is 16 megabytes and the second bank is 128 megabytes, only $2^{24}$ addresses are physically available in the address subset corresponding to the 16 megabyte memory bank. Therefore, a programmer writing programs for such a system must account for the non-contiguous memory space, which produces a gap in addresses between the end of the first bank and beginning of the second bank.

Traditionally, the lower bits of the transfer address (i.e. bits TA[N−1−n:0]) are passed directly to the memory banks because they provide a contiguous address space within each subset of the addresses. If the subsets of the addresses are not themselves contiguous, the programming difficulty of keeping track of which addresses are available increases manifold.

Figure 2:
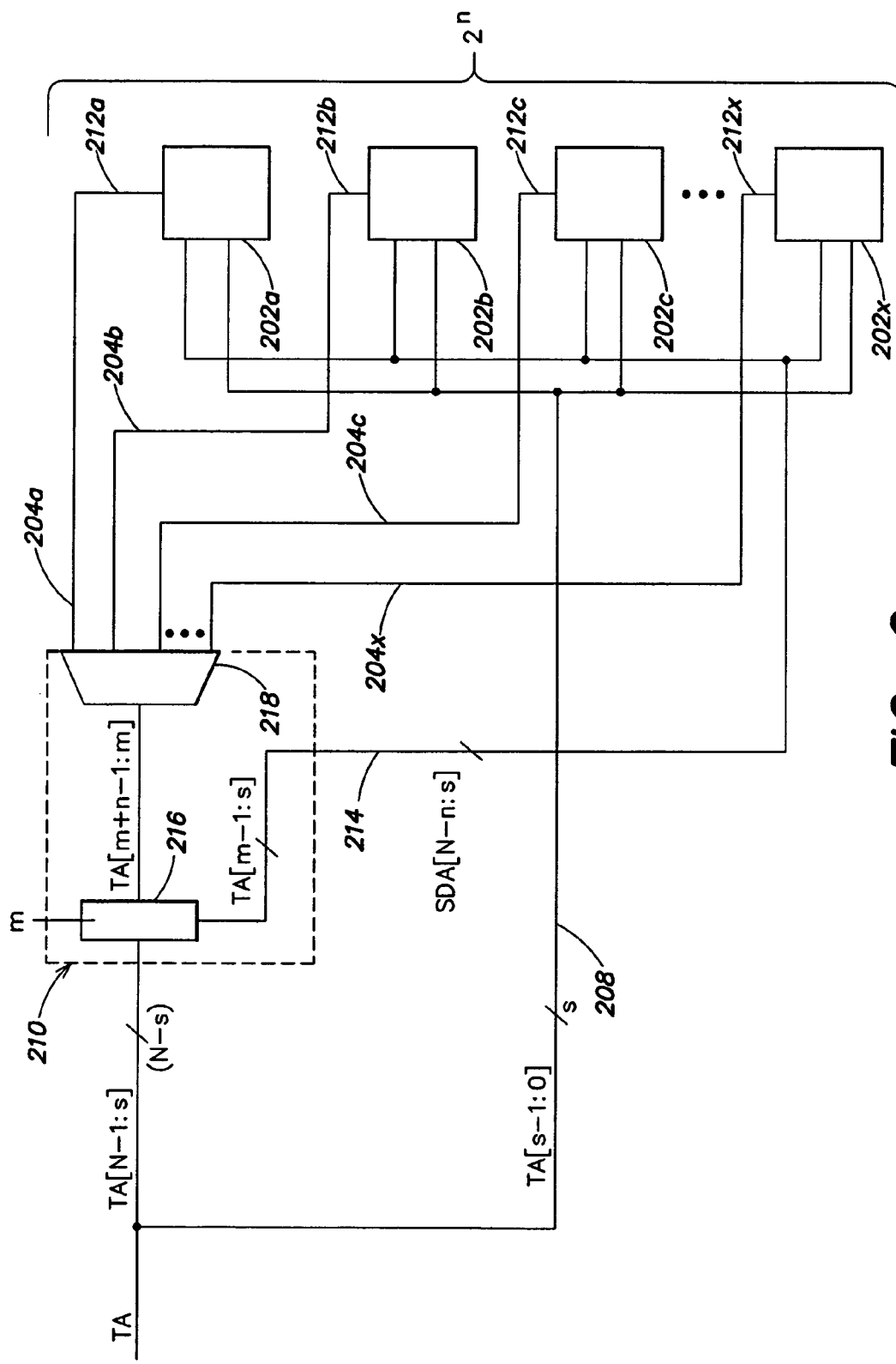
FIG. 2 is a schematic representation of a second prior art memory system with a memory controller determining target memory banks and programmable target memory bank address size.

FIG. 2 is a schematic representation of a second prior art memory system that permits a programmable target memory bank address size. In this system, $2^n$ memory banks 202a–202x are connected to a memory controller 210 through enable lines 204a–204x and through lines 214, which carry high order target memory bank address bits (SD address bits), and to a processing device through lines 208, which carry the low order address bits. The memory controller is connected to the processing device through lines 306, which carry high order target address bits.

Address lines 208 carry the s lowest order bits of the transfer address (bits TA[s−1:0]) directly to the lower order bits of the memory banks, where $2^s$ is the size of the smallest supported memory bank. The rest of the address bits (bits TA[N−1:s]) are supplied to the memory controller 210.

The memory controller 210 may include logic 216 that is programmed with the value m, such that $2^m$ is the size of the largest installed memory bank (which may be smaller than the largest allowed memory bank). When the largest installed memory bank is of the largest allowed size, m=(N−n).

Once programmed with the value m, the memory controller logic 216 passes m−k of the lower order address bits (bits TA[m−1:s]) to lines 214 and uses a decoder 218 to determine the target memory bank from the next n bits (bits TA[m+n−1:m]).

In this configuration, the address space is logically divided into subsets of size $2^m$ addresses. If all installed memory banks are of the same size ($2^m$ bytes), the memory address space may be contiguous, even if the installed memory banks are not of the maximum allowed size. However, if at least one of the installed memory banks is different in size from the others, the address space is not contiguous. Therefore, the programs running on such systems still need to keep track of which addresses are available and which are not. Furthermore, size m must be programmed in the system for each particular configuration.

Figure 3:
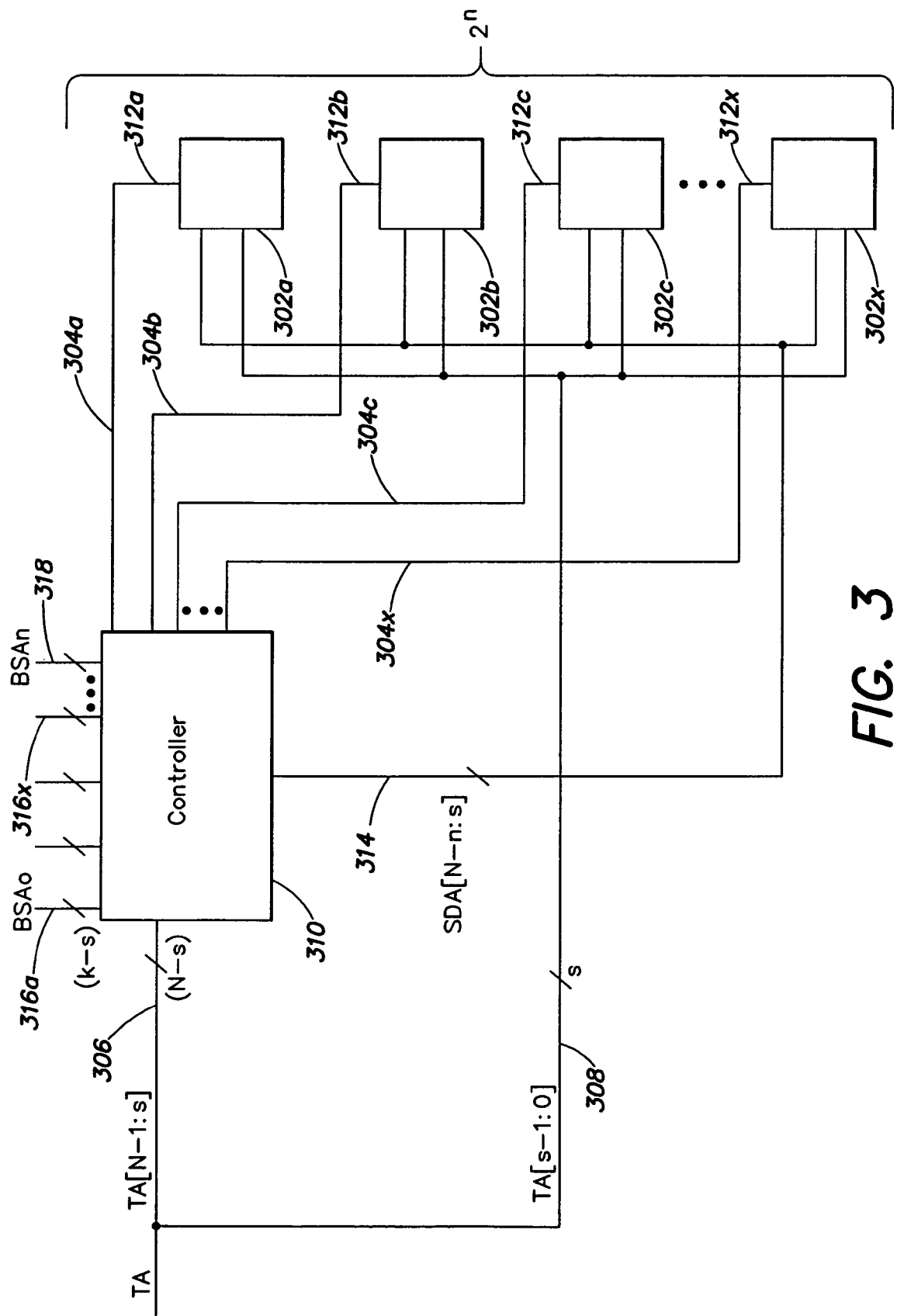
FIG. 3 is a schematic representation of the memory system of an illustrative embodiment.

FIG. 3 is a schematic representation of a memory system of an illustrative embodiment of the invention. Memory banks 302a–302x are connected to a memory controller 310 through enable lines 304a–304x and to a processing device through address lines 308. Encoded on lines 308 is part of a transfer address which constitutes lower order bits of the SD address. Lines 314 carry the remaining bits of the SD address.

In a system with allowed memory bank sizes from $2^s$ (size of the smallest allowed memory bank) to $2^k$ (size of the largest allowed memory bank), lines 314 carry bits SDA[N−n:s]. The present invention is not limited to systems where the allowed sizes of the memory banks are powers of two. In a system where memory bank sizes are not powers of two, the next higher power of two may be used for the purpose of calculating the minimum number of bits required to carry each part of the SD address.

The minimum size of the transfer address, N, may be calculated such that N=n+k. Memory controller 310 receives transfer address bits TA[N−1:s] as inputs and provides signals on enable lines 304a–304x and SD address lines 314. Registers 316a–316x and 318 provide bank start address inputs to the memory controller 310 as described below.

Memory controller 310 determines the target memory bank based on its inputs and maps (k−s) bits of the target address to the SDRAM address for the target memory bank. That is, the SD address is not identical to a portion of the target address as described in the systems of FIGS. 1 and 2. Memory controller 310 performs address translation, thus providing a contiguous memory address space to the processing device. This address translation is efficient because it takes place in hardware and involves only a subset of the address bits. The number of bits that require translation is the minimum number of bits required to represent all allowable memory bank sizes and may vary from system to system. Implementation and operation of registers 316 and 318 and memory controller 310 are further described below in connection with FIGS. 4–7.

Figure 4A:
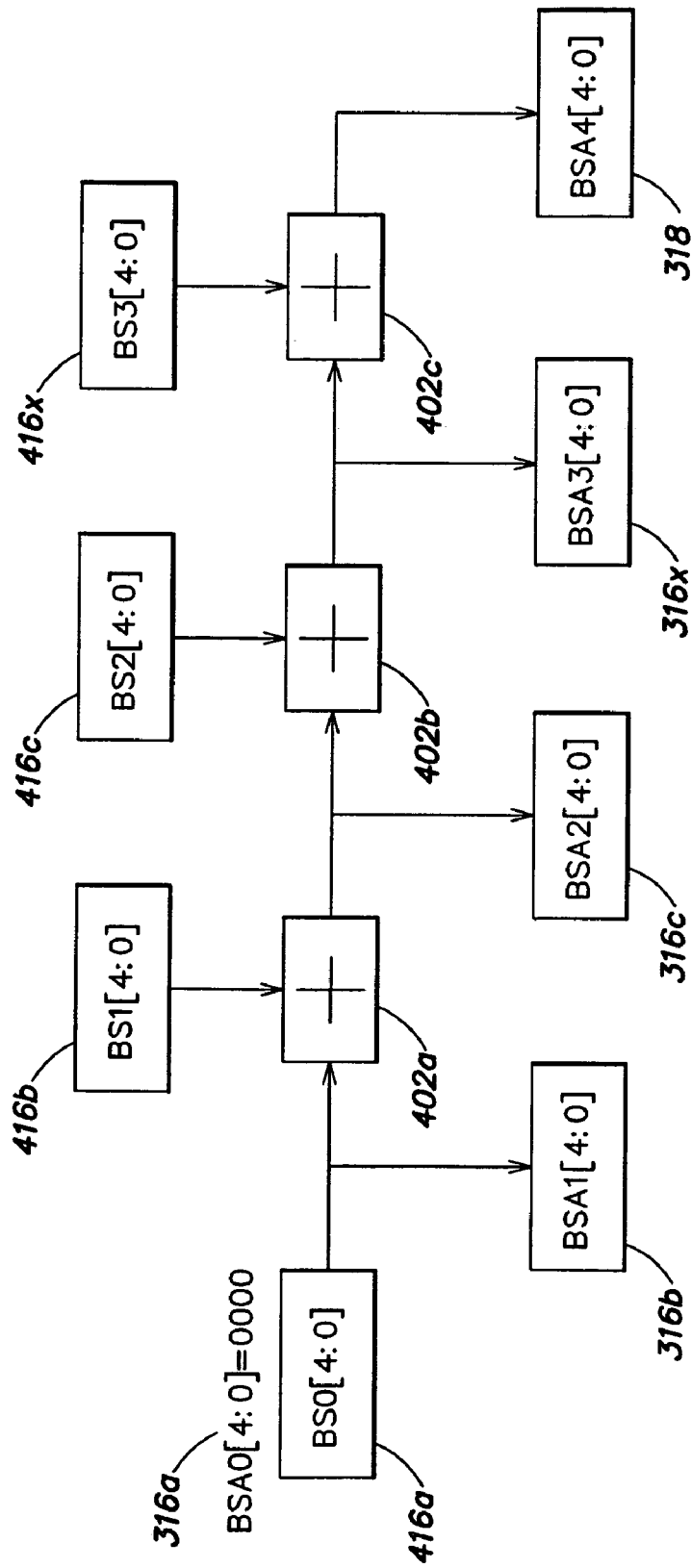
FIG. 4A is a schematic representation of size registers and associated adders of the illustrative embodiment.

FIG. 4A is a schematic representation of size registers and associated adders of the illustrative embodiment. Bank size registers 416a–x and adders 402a–402(x−1) are used to compute start addresses for each memory bank. Bank size registers hold the sizes of the respective memory banks, and that information is entered by the programmer. Although registers BS0, BS1, BS2, and BS3 are shown in FIG. 4A, the present invention is not limited to systems with four memory banks. Furthermore, representations of sizes of particular registers and numbers of bits required for particular computations are shown for illustrative purposes only and are not limiting. The system may be modified for a variety of memories of different sizes, as is understood by one skilled in the art.

Illustrated in FIGS. 4A–7 is an embodiment of the invention which permits at most 4 memory banks, with allowed bank sizes of 16 megabytes, 32 megabytes, 64 megabytes, and 128 megabytes. Consequently, variables s, k, N, and n may be calculated as follows:

The size of the smallest allowed memory bank is $2^{24}$ bytes=$2^s$→s=24.

The size of the largest allowed memory bank is $2^{27}$ bytes=$2^k$→k=27.

Maximum number of memory banks is

4=$2^n$→n=2.

N=k+n=27+2=29 bits.

Thus, the transfer address contains 29 bits.

Registers BSA0–BS3 each hold (k−s+n)=27−24+2=5 bits.

An example of bank size encoding for registers 416 is illustrated in FIG. 5. For example, a 16 megabyte memory bank may have its size encoded as 00001, and this value may be held in bank size register 416a. The present invention is not limited to the illustrated memory bank size encodings, and other bank size encodings may be utilized.

The memory address space for each memory bank is contiguous. Therefore, the starting address for each of the memory banks and for the beginning of the unpopulated/reserved space may be determined by adding the sizes of each bank that precedes that bank. This may be done by summing the bank size encodings listed in FIG. 5 for each bank, as shown in FIG. 6. If the size of all installed memory banks is 128 megabytes, then the address space is fully populated. If any bank is less than 128 MB, the address space after the last bank is referred to as "unpopulated/reserved" space. Any access to unpopulated/reserved space may generate an internal bus error.

Adders 402a–402c may be used to perform computation of the start addresses for the memory banks. Each of adders 402a–402c sums a bank start address and a corresponding encoded bank size and outputs a start address of the following memory bank. Results of the additions are bank start addresses 316a–316x, which are input to memory controller 310.

A sample start address table is shown in FIG. 7. For example, in a system with memory banks of the following sizes: 32 MB, 32 MB, 16 MB, and 64 MB, start addresses 702a–702x, respectively, may be obtained. Reserved space may be indicated by address 718. Any request for an address that is higher than address 718 results in an error.

Figure 4B:
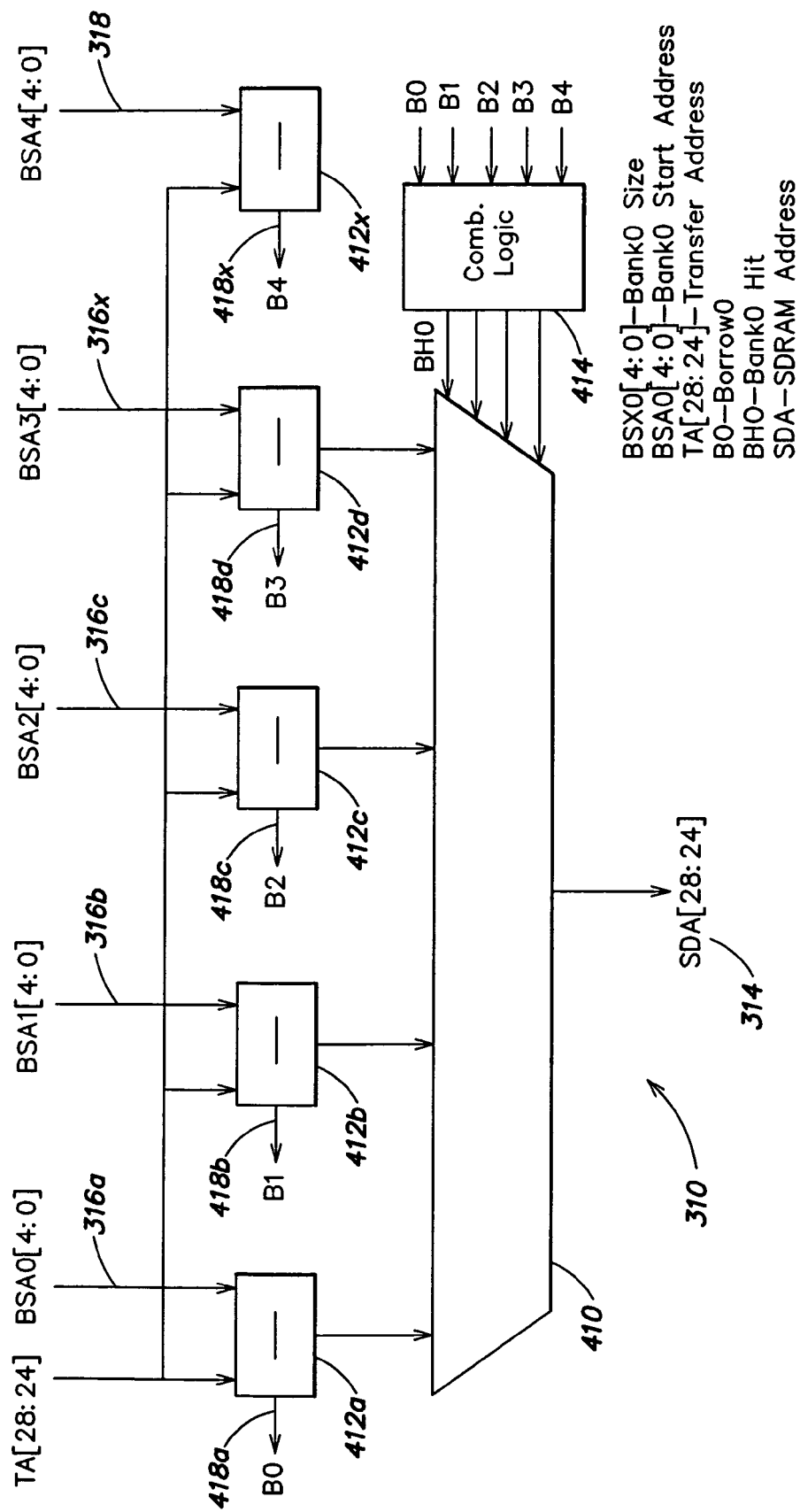
FIG. 4B is a schematic representation of a memory controller of the illustrative embodiment.

FIG. 4B is a schematic representation of memory controller 310 of the illustrative embodiment. When memory controller 310 receives a transfer address 306, the transfer address is compared by subtractors 412a–412x with the upper order bits of the start address of each bank. Comparison is performed by subtracting high order bits of the start address of each bank from high order bits of the transfer address. If the result of subtraction is negative, as indicated by the appropriate borrow output of the subtractor, then the preceding memory bank is selected by combination logic 414 as the target memory bank. The different outputs of subtractors 412a–412x are supplied to respective inputs of a multiplexer 410.

Logically, if a start address for a particular bank is larger than the transfer address, then the transfer address is not located in that particular memory bank or any of the following memory banks. Therefore, the transfer address is located in one of the preceding memory banks. More than one borrow may be positive, because there may be more than one memory bank for which the start address is larger than the transfer address. By selecting the memory bank with the largest start address for which the result of the subtraction is positive, memory controller 310 selects the correct target memory bank.

Combination logic 414 receives borrows 418a–418x as inputs and outputs control signals to multiplexer 410 which, in turn selects an output from one of the subtractors 412a–412x to pass on as part of the SD address. As described above, the combination logic 414 selects the memory bank with the largest start address for which the result of the subtraction, as indicated by the borrow outputs of subtractors 412a–412x, is positive. Combination logic 414 also outputs results on the enable lines 304, enabling the target memory bank.

Mapping of the transfer address to the SD address results from this selection because results of the subtraction become new high order bits for the SD address, which is the target memory bank address. In the illustrative embodiment of the invention, one set of subtractors is used to determine the target memory bank and to perform the address mapping. In an alternative embodiment of the invention, different sets of combination logic may be used to determine the target memory bank and to perform the address mapping. sizes for those nonexistent memory banks into memory bank size registers and then set those locations as disabled, thus guaranteeing that any logical part of the memory address space falling to those locations will be inaccessible.

Contiguous memory address space is achieved through hardware memory address mapping. As a result, programs running on the processing devices may allocate memory regions without knowledge of the specific location of those regions within different memory banks. Furthermore, it may be possible to use only the desired amount of memory. For example, in a system where 144 MB are desired for a particular implementation, memory banks of 128 MB an 16 MB may be installed, and memory may be allocated without regard to where a particular part of the allocated memory is physically located. Therefore, programs and compilers may avoid overhead that would otherwise be associated with memory management functions.

It should be understood that the present invention is not limited to the system of the illustrative embodiment. All combination logic may be modified and adapted as appropriate for a particular implementation and as deemed appropriate by one skilled in the art. As should be further recognized by one skilled in the art, the present invention is not limited to the particular memory sizes or register or word sizes described in connection with the illustrative embodiment. Any number of memory types and sizes may be used as appropriate for a particular implementation of the invention.

What is claimed is:

1. A method for operating a memory system comprising a set of memory banks and a memory controller, said method comprising:
   selecting a memory bank from the set of memory banks based on a transfer address and indicators of sizes of the memory banks; and
   mapping the transfer address to a target address in the selected memory bank based on a first address in the selected memory bank, wherein mapping the transfer address to the selected memory bank address comprises subtracting a subset of bits in the first address in the selected memory bank from the transfer address, wherein the set of memory banks has a contiguous memory address space and wherein the address space within each of the memory banks is contiguous.

2. The method of claim 1, wherein selecting the memory bank comprises subtracting the indicators of the sizes of the memory banks from bits in the transfer address.

3. The method of claim 2, wherein selecting the memory bank further comprises selecting a memory bank with the largest first address for which results of the subtraction are positive.

4. The method of claim 2, wherein the subtracting is performed in parallel.

5. The method of claim 4, wherein the indicator of the size of a memory bank is a subset of bits in a first address in the next memory bank.

6. The method of claim 1, further comprising computing a first address in each of the memory banks in the set of memory banks.

7. The method of claim 6, wherein computing a first address in a memory bank comprises adding contents of a size register for a previous memory bank to a first address in the previous memory bank.

8. The method of claim 1, further comprising enabling the selected memory bank.

9. The method of claim 1, further comprising returning an error if the selected memory bank is disabled.

10. The method of claim 1, further comprising computing an indicator of a size of total memory available.

11. The method of claim 10 further comprising:
    subtracting the indicator of the size of the total memory available from appropriate bits of the address; and
    returning an error if result of the subtraction is positive.

12. A memory system comprising:
    a set of memory banks;
    logic for calculating a first address in each memory bank from the set of memory banks; and
    a controller receiving a transfer address from a computing device, said controller comprising logic for selecting a memory bank from the set of memory banks based on the transfer address and the first addresses of the memory banks and for mapping the transfer address to a target address in the selected memory bank based on a first address in the selected memory bank, wherein the controller further comprises logic for determining a target address in the selected memory bank, including a subtractor for subtracting a subset of bits of a first address in the selected memory bank from a subset of bits in the transfer address, wherein the set of memory banks has a contiguous memory address space and wherein the address space within each of the memory banks is contiguous.

13. The memory system of claim 12, wherein the logic for calculating a first address in each memory bank comprises adders for adding an indicator of a size of a previous memory bank to appropriate bits in a first address in the previous memory bank.

14. The memory system of claim 13, further comprising a set of registers containing indicators of memory bank sizes.

15. The memory system of claim 14, wherein an indicator of a size of a memory bank for each memory bank is w bits wide, where w is a number of bits sufficient to represent all allowed memory bank sizes.

16. The memory system of claim 15, wherein w=k−s+n where $2^k$ is the largest allowed bank size and $2^s$ is the smallest allowed bank size, and wherein $2^n$ is the closest approximation of the number of memory banks.

17. The memory system of claim 12, wherein the logic for selecting the memory bank comprises subtractors for subtracting a subset of bits of the first addresses of the memory banks from bits of the transfer address.

18. The memory system of claim 17, wherein the selected memory bank is a memory bank with the largest first address for which results of the subtraction are positive.

19. The memory system of claim 12, further comprising logic for enabling the selected memory bank.

20. The memory system of claim 12, wherein the controller further comprises logic to return an error if the selected memory bank is disabled.

21. The memory system of claim 12, wherein the controller further comprises logic to return an error if the transfer address is outside of an available range of addresses.

22. The memory system of claim 21, wherein the logic to return an error if the address is outside of the available range further comprises
   a subtractor to subtract an indicator of total available memory size from a subset of bits of the transfer address, and
   logic to return the error if result of the subtraction is positive.

23. A memory system comprising:
   a set of memory banks; and
   a memory controller including:
   means for selecting a memory bank from the set of memory banks based on a transfer address and indicators of sizes of the memory banks; and
   means for determining a target address based on the transfer address and a first address in the selected memory bank, wherein the means for determining a target address comprises means for subtracting the first address in the selected memory bank from the transfer address, wherein the set of memory banks has a contiguous memory address space and wherein the address space within each of the memory banks is contiguous.

24. The system of claim 23, wherein said means for selecting a memory bank further comprises means for subtracting the indicators of the sizes of the memory banks from bits in the transfer address.

25. The system of claim 23, further comprising means for computing a first address in a memory bank for each of the memory banks in the set of memory banks.

26. The system of claim 25, wherein the means for computing a first address in a memory bank comprises means for adding contents of a size register for a previous memory bank to a first address in the previous memory bank.

27. The system of claim 23, further comprising means for returning an error if the target memory bank is disabled.

* * * * *